Oct. 30, 1951

O. BILLING 2,573,388

VOLTAGE STABILIZER

Filed Feb. 7, 1950

INVENTOR.
Olle Billing
BY Fred M. Vogel
AGENT

UNITED STATES PATENT OFFICE 2,573,388

VOLTAGE STABILIZER

Olle Billing, Norrkoping, Sweden, assignor to Hartford National Bank and Trust Company, trustee, Hartford, Conn.

Application February 7, 1950, Serial No. 142,916
In the Netherlands February 9, 1949

4 Claims. (Cl. 323—66)

The present invention relates to voltage stabilizer circuits.

There are presently known voltage stabilizers comprising an adjustable impedance, for example a premagnetized choke, connected in series with a load device to an alternating voltage source in which the voltage across the load is maintained substantially constant despite variations in the alternating voltage source, for example a power line voltage or a transformer voltage. At an increasing line voltage, the difference with respect to the usual line voltage may then be compensated by means of a decrease in premagnetization and hence a higher reactance of the choke and a higher voltage across the alternating-current winding thereof, so that the load device is nevertheless supplied with a constant alternating voltage.

Although, in principle, such a stabilizer operates satisfactorily, it involves various disadvantages. Firstly the voltage across the adjustable impedance is considerable, for example several times greater than the difference voltage between the voltage of the alternating voltage source and that across the load device. This is evident, if it is assumed, for the sake of simplicity, that the load device is constituted by an ohmic load, so that the vectorial diagram is formed by a right-angled triangle, the hypotenuse being the alternating voltage and the base and perpendicular thereof being the voltages across the impedance and the load device. The voltage across the impedance will be comparatively high even with a relatively slight difference between the voltage at the consuming device and the alternating voltage.

A second disadvantage is that exactly when the voltage of the alternating voltage source is high, the voltage across the impedance is also high. It is known that an impedance comprising an iron core produces a number of harmonics which, as a rule, are undesirable. In the present instance this number is increased when the alternating voltage across the impedance is high.

The invention is based on recognition of the fact that these disadvantages can be obviated by very simple means.

According to the invention, in a voltage stabilizer comprising an adjustable impedance, for example a premagnetized choke, connected in series with a load device in which the voltage is maintained substantially constant, the impedance has, for this purpose, connected in parallel with it an ohmic resistance, the value of which is chosen to be such that it is comparatively high with respect to the reactance of the impedance at a comparatively slight difference between the voltages of an alternating voltage source and of the load device and is relatively low at a comparatively great difference between the said voltages.

Again assuming for the sake of simplicity that a load device of ohmic nature is employed, the addition of the ohmic resistance results in that the aforesaid vectorial diagram formed by a right-angled triangle changes into a triangle having an obtuse angle instead of a right angle. This is due to the parallel connection of the impedance and the resistance which produces a phase-shift of the voltage across the impedance such that this voltage becomes more nearly in phase with the voltage across the load device. Thus, the voltage across the impedance remains lower than in the known arrangement described above. This will be explained more fully with reference to the description in connection with the figures in the drawing.

A second advantage is that, when the voltage of the alternating voltage source is comparatively high, the reactance of the impedance is also high and the value of the parallel-connected resistance is proportionally low. Consequently a considerable part of the current will pass through the resistance in which harmonics are not produced so that the percentage of harmonics produced in the impedance decreases.

As a matter of course, the desired value of the parallel-connected resistance varies with the choice of the other factors, such as the alternating voltage source, the voltage of the load device and the value of the adjustable impedance. It may be calculated for each particular case in accordance with the requirements to be satisfied for a desired vectorial diagram.

According to a further feature of the invention, the resistance is matched to the reactance of the impedance in such manner that an increase in voltage of the alternating voltage source is largely compensated by the action of the phase-shift of the voltage across the resistance with respect to the voltage of the consuming device. If the resistance is of the adjustable type, its value may, for particular cases, be matched more accurately to the requirements to be satisfied.

In order that the invention may be more clearly understood and readily carried into effect, it will now be described more fully with reference to the accompanying drawing wherein.

Figure 1:
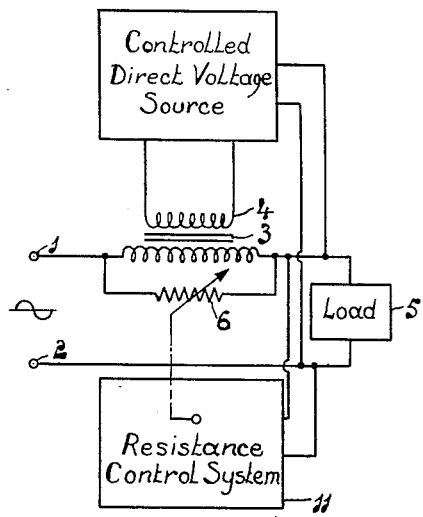
Fig. 1 shows schematically one embodiment of the invention.

In Fig. 1, terminals 1 and 2 are connected to an alternating voltage line and are connected to a load device 5 through a choke 3, which is premagnetized by a direct current applied to a premagnetizing winding 4. An ohmic resistance 6 is connected in parallel to the alternating-current winding of the choke 3.

Figures 2, 3:
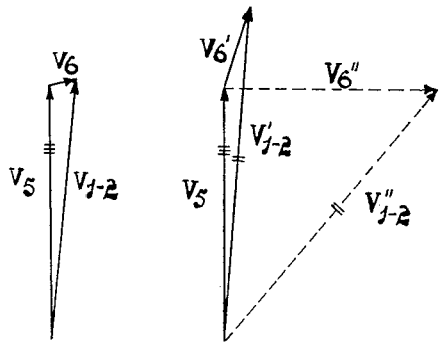
Fig. 2 is a vector diagram explanatory of the invention.
Fig. 3 is a vector diagram explanatory of the invention.

Fig. 2 shows the vectorial diagram for the case in which the alternating voltage $V_{1-2}$ from the power line differs but slightly from the voltage $V_5$ of the load device. It is assumed that the load device 5 is ohmic in nature. The reactance of the choke is comparatively small at a small difference between the alternating voltage $V_{1-2}$ and the voltage $V_5$ of the line device so that the resistance 6 represents a comparatively high value. The resistance is traversed by a low current, so that the parallel-connection may primarily be regarded as a reactance and the voltage vector $V_6$ is almost at right angles to the vector $V_5$.

If the line voltage vector $V_{1-2}$ has increased, as shown in Fig. 3, whereas the voltage vector $V_5$ is required to remain constant, the reactance of the choke 3 is increased by decrease of the direct-current premagnetization through the winding 4, in a manner known per se as a function of the increase in $V_{1-2}$ to such an extent that the difference voltage is absorbed by the choke. (See e. g. U. S. A. Patent 2,431,312.) Then the resistance 6 has a comparatively low value, however, so that it takes a considerable part of the current. The nature of the parallel-connection then becomes more highly ohmic, so that the vector $V'_6$ becomes more nearly in phase with $V_5$. The difference between the vector $V'_6$ and the vector $V''_6$ with the use of a choke 3 without resistance 6 is shown in the dotted lines in Fig. 3, from which it appears that the vector $V'_6$ is considerably smaller. Furthermore, a much smaller number of harmonics are produced in the choke, since the current passing through it is materially lower owing to the high current traversing the resistance.

Figure 4:
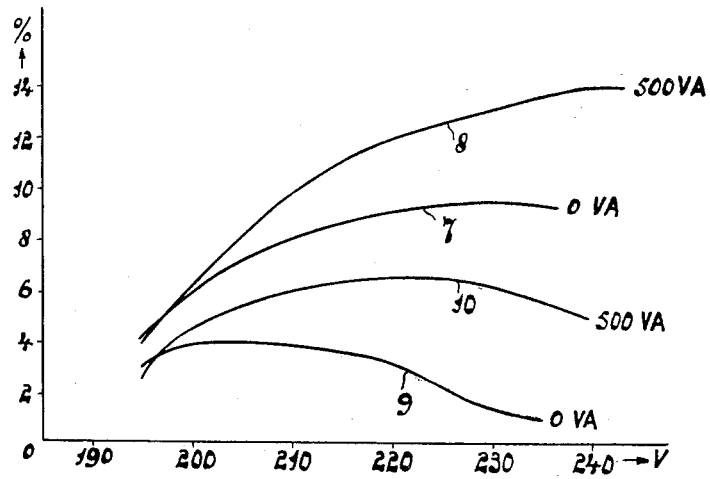
Fig. 4 is a graph explanatory of the invention.
Figure 5:
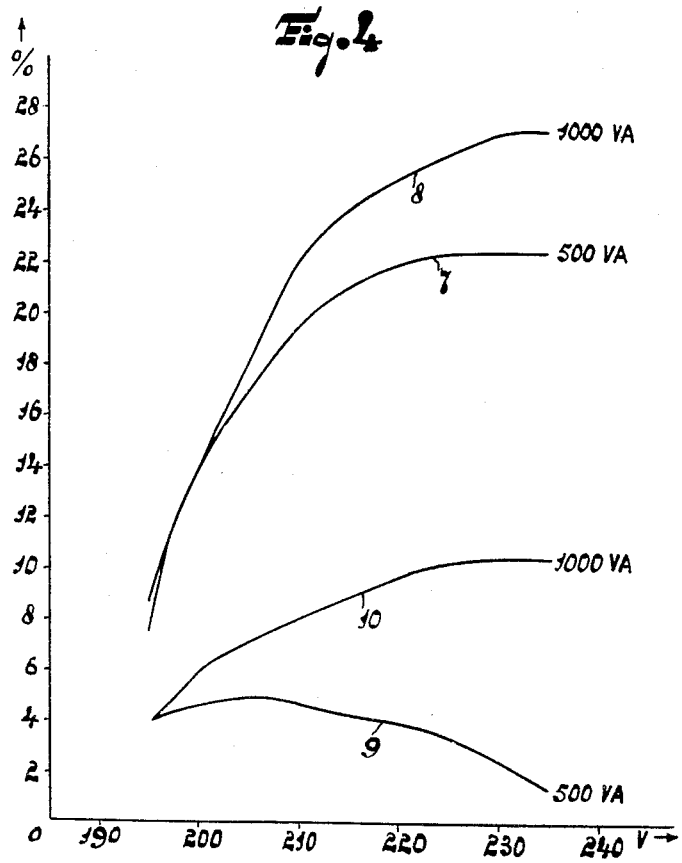
Fig. 5 is a graph explanatory of the invention.

As a result, the deformation is much less. This is shown in Figs. 4 and 5. The curves 7 and 8 show the deformation in percent for various mains voltages and with no-load respectively and an ohmic load corresponding to 500 v./a., the resistance 6 of Fig. 1 being left out. The curves 9 and 10 apply to the case in which the resistance is present.

In Fig. 5 the loads are 500 and 1000 v./a. respectively, in which event the effect is even stronger. The deformation of the mains voltage in these cases was 2.5%.

An even more favourable effect is obtainable if the resistance is constructed to be variable and variation in the resistance value by means known per se which do not form part of the invention, is achieved automatically. The resistance 6 may be varied by the movement of the movable member of a measuring instrument 11 electrically connected across the load 5 (Fig. 1). In a practical case favourable results have been obtained by the use of a resistance of 28 ohms with a choke having a variable reactance of, for example, 5 to 70 ohms.

What I claim is:

1. Apparatus to stabilize the voltage established across a load connected to an alternating-voltage source subject to fluctuations comprising a variable impedance interposed between said load and said source, means to vary the value of said impedance as a function of the voltage of said load in a direction compensating for said fluctuations, a variable resistance connected across said impedance, and means responsive to the voltage across said load to vary the resistance to have a value which is high with respect to the reactance of said impedance at a relatively small difference between the alternating voltages of the source and of the load and is low at a relatively large difference therebetween.

2. A voltage stabilizer, as set forth in claim 1, wherein said resistance is matched to the reactance of said impedance such that an increase in voltage of the alternating current source is substantially compensated by the action of the phase shift in the voltage across the resistance with respect to the voltage across the load.

3. A voltage stabilizer, as set forth in claim 1, wherein said load is primarily of an ohmic nature.

4. Apparatus to stabilize the voltage established across a load connected to an alternating-voltage source subject to fluctuations comprising a premagnetized choke interposed between said load and said source, means to vary the magnetization of said choke as a function of the voltage of said load in a direction compensating for said fluctuations, a variable resistance connected across said impedance, and means responsive to the voltage across said load to vary the resistance to have a value which is high with respect to the reactance of the impedance at a relatively small difference between the alternating voltages of the source and of the load and is low at a relatively large difference between said alternating voltages.

OLLE BILLING.

REFERENCES CITED

The following references are of record in the file of this patent:

UNITED STATES PATENTS

| Number | Name | Date |
|---|---|---|
| 2,039,044 | Wolfert et al. | Apr. 28, 1936 |

OTHER REFERENCES

Publication, "Wireless World," June 1943, pp. 166–167.